(12) United States Patent
Kim

(10) Patent No.: US 8,837,344 B2
(45) Date of Patent: Sep. 16, 2014

(54) APPARATUS AND METHOD FOR MULTICAST/BROADCAST SERVICE DATA TRANSMISSION SYNCHRONIZATION

(75) Inventor: Kwang-Yong Kim, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 108 days.

(21) Appl. No.: 13/586,239

(22) Filed: Aug. 15, 2012

(65) Prior Publication Data

US 2013/0121231 A1    May 16, 2013

(30) Foreign Application Priority Data

Nov. 11, 2011   (KR) .................. 10-2011-0117841

(51) Int. Cl.
*H04W 4/06*    (2009.01)
(52) U.S. Cl.
USPC .......................................................... 370/312
(58) Field of Classification Search
CPC ...................................................... H04W 4/06
USPC ........................................................... 370/312
See application file for complete search history.

(56) References Cited

U.S. PATENT DOCUMENTS

| | | | |
|---|---|---|---|
| 2008/0051026 A1* | 2/2008 | Kim et al. | 455/3.01 |
| 2008/0175237 A1* | 7/2008 | Kim | 370/389 |
| 2009/0069003 A1* | 3/2009 | Kim et al. | 455/422.1 |
| 2010/0061288 A1* | 3/2010 | Yun et al. | 370/312 |

FOREIGN PATENT DOCUMENTS

KR   1020080073553 A   8/2008

* cited by examiner

*Primary Examiner* — Albert T Chou
(74) *Attorney, Agent, or Firm* — Ladas & Parry LLP

(57) ABSTRACT

An MBS data transmission synchronization apparatus of a radio access station is provided. The MBS data transmission synchronization apparatus includes an information reception unit that receives transmission synchronization information from an ACR, an information reception loss check unit that determines whether the received transmission synchronization information is lost, a content reception unit that sequentially receives a content packet including content time information from an MBS content source, a packet reception loss check unit that determines whether the received content packet is lost, a retransmission request unit that transmits a retransmission request message to the ACR, a transmission time determination unit that determines a transmission time of the received content packet on the basis of the transmission synchronization information and the content time information, and a content transmission unit that transmits the received content packet to mobile terminals at the transmission time.

19 Claims, 5 Drawing Sheets

APPARATUS AND METHOD FOR MULTICAST/BROADCAST SERVICE DATA TRANSMISSION SYNCHRONIZATION

CROSS-REFERENCE TO RELATED APPLICATION

This application claims the benefit under 35 U.S.C. §119(a) of Korean Patent Application No. 10-2011-0117841, filed on Nov. 11, 2011, the entire disclosure of which is incorporated herein by reference for all purposes.

BACKGROUND

1. Field

The following description relates to a multicast/broadcast service (MBS), and more particularly, to an MBS data transmission synchronization apparatus and method that perform transmission synchronization of MBS data transmitted from a wireless network to a mobile terminal.

2. Description of the Related Art

In the WiBro/Wi-Fi network, mobile terminals included in the same multicast group receive the same MBS contents. MBS contents are transmitted as an MBS flow that is represented as a multicast connection identifier (MCID) and security aggregation (SA) in a base station. An MBS zone indicates a zone in which one MBS flow is valid. MBS contents that are transmitted to mobile terminals in the same MBS zone are required to be synchronized for obtaining a macro diversity gain.

Mobile terminals receive MBS contents of an MBS content source through an access control router (ACR) and a radio access station (RAS), namely, a base station. Here, the MBS contents and the ACR are connected by cable, and the ACR and the RAS are connected wirelessly. That is, the RAS transmits MBS contents received through the ACR to mobile terminals located in a cell over a wireless network.

However, even though the MBS content source transmits MBS contents to different RASs in the same MBS zone at the same time, the different RASs may receive the MBS contents at different times. For example, times at which the RASs receive the MBS contents may differ according to paths from the MBS content source to the different RASs in the same MBS zone.

Since different RASs receive MBS contents at different times, mobile terminals located in a cell for each of the RASs may receive different content packets. For example, if a time at which a first RAS in the same MBS zone transmits MBS contents is earlier by two frames than a time at which a second RAS in the same MBS zone transmits MBS contents, mobile terminals located in the first RAS receive the third packet of the MBS contents when mobile terminals located in the second RAS receive the first packet of the MBS contents.

MBS content transmission times of RASs differ, and thus, when a mobile terminal performs handover to a different RAS in the same MBS zone while receiving MBS contents, it is unable to seamlessly receive MBS contents. That is, the mobile terminal receives MBS contents degraded by redundancy or loss.

Therefore, to overcome such limitations, Korean Patent Publication No. 10-2008-0073553 discloses an apparatus for synchronizing transmission of multicast/broadcast service data and a method using the same that synchronize the transmission time of MBS contents to an RAS and retransmit a lost MBS content packet.

However, in the above-described conventional technology, the synchronization apparatus operates on the assumption that contents consisting of transmission synchronization information and packet data are all transmitted to a plurality of base stations without error. That is, when at least one of a plurality of base stations in the same MBS zone cannot receive transmission synchronization information or receive all or a portion of packet data, information and packet data that have been already lost before determining a sync transmission time are transmitted to a mobile terminal. Therefore, when a mobile terminal receives MBS contents and simultaneously performs handover to a different RAS in the same MBS zone, seamless reception of MBS contents cannot be ensured, nor can synchronization of MBS contents transmitted to mobile terminals in the same MBS zone for obtaining a macro diversity gain. Thus, since a base station that has not received transmission synchronization information cannot determine a transmission time, a mobile terminal receives MBS contents degraded by redundancy or loss. Accordingly, a method is required in which a plurality of RASs are guaranteed to receive transmission synchronization information and reliable packet data contents prior to determining a sync transmission time.

SUMMARY

The following description relates to an apparatus and a method in which a plurality of RASs in the same MBS zone are guaranteed to receive transmission synchronization information and reliable packet data contents prior to determining a synchronization time, such that the RASs can synchronize transmission time of MBS contents received from an MBS content source.

In one general aspect, an MBS data transmission synchronization apparatus of a radio access station includes: an information reception unit configured to receive transmission synchronization information from an access control router (ACR); an information reception loss check unit configured to determine whether the transmission synchronization information received through the information reception unit is lost; a content reception unit configured to sequentially receive a content packet from an MBS content source, the content packet including content time information; a packet reception loss check unit configured to determine whether the content packet received through the content reception unit is lost; a retransmission request unit configured to transmit a retransmission request message for lost transmission synchronization information or a lost content packet to the ACR in response to a request from the information reception loss check unit or the packet reception loss check unit; a transmission time determination unit configured to determine a transmission time of the received content packet on the basis of the transmission synchronization information and the content time information; and a content transmission unit configured to transmit the received content packet to a plurality of mobile terminals at the transmission time.

In another general aspect, an MBS data transmission synchronization apparatus of an ACR includes: a synchronization information transmission unit configured to wirelessly transmit transmission synchronization information to one or more RASs; a content packet transmission unit configured to transmit a content packet to the RASs; a retransmission request reception unit configured to monitor whether a retransmission request for the transmission synchronization information or content packet transmitted to the one or more RASs is received; and a retransmission processing unit including a retransmission controller configured to output a control signal to the synchronization information transmission unit or the content information transmission unit in response to reception of the retransmission request from the retransmission request reception unit, the control signal enabling retransmission of synchronization information or a content packet whose retransmission has been requested to a corresponding RAS.

Other features and aspects will be apparent from the following detailed description, the drawings, and the claims.

Figure 1:
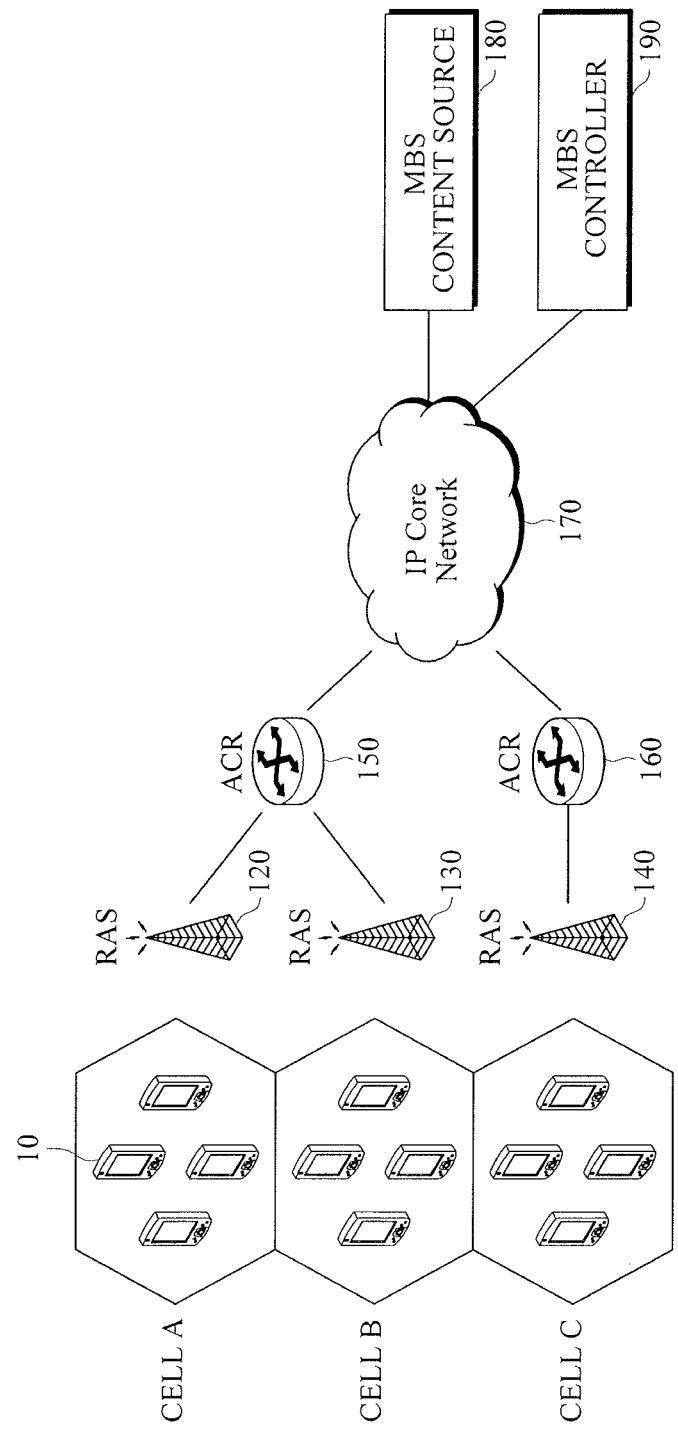
FIG. 1 is a system diagram for describing an MBS data transmission synchronization apparatus according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, embodiments of the present invention will be described in detail with reference to the accompanying drawings.

FIG. 1 is a system diagram for describing an MBS data transmission synchronization apparatus according to an embodiment of the present invention.

Referring to FIG. 1, a system includes a plurality of mobile terminals 110, a plurality of RASs 120 to 140, a plurality of ACRs 150 and 160, an MBS content source 180, and an MBS controller 190.

Each of the mobile terminals 110 displays MBS contents that are received through a wireless section. Each mobile terminal 110 determines whether a content packet is lost, and when the content packet is lost, each mobile terminal 110 requests retransmission of the lost content packet from the RASs 120 to 140 for a corresponding cell in a unicast scheme. Here, each mobile terminal 110 checks a sequence number included in the content packet to determine whether the content packet is lost.

Each of the RASs 120 to 140 performs the function of an MBS data transmission synchronization apparatus according to the present invention. That is, each RAS receives transmission synchronization information transmitted from the MBS controller 190 and a content packet including content time information transmitted from the MBS content source 180, over an Internet protocol (IP) core network 170 and the ACRs 150 and 160, and determines a transmission time of the content packet on the basis of the transmission synchronization information and the content time information. Each RAS transmits the content packet to mobile terminals 110 located in a corresponding cell at the transmission time.

In this case, when an ACR performs the function of an MBS controller, the ACR may transmit transmission synchronization information, and an RAS may receive the transmission synchronization information transmitted from the ACR. For example, when only one ACR is included in the same MBS zone, the function of the MBS controller may be added to the ACR, and thus, the RAS may receive the transmission synchronization information transmitted from the ACR, or by configuring an MBS controller separately from the ACR, the RAS may receive the transmission synchronization information transmitted from the MBS controller. However, when two or more ACRs are included in the same MBS zone, an MBS controller may be separately configured, and an RAS may receive transmission synchronization information transmitted from the MBS controller though an ACR.

According to an embodiment of the present invention, the RASs 120 to 140 determine whether received content packets and transmission synchronization information are lost before transmitting the content packets to mobile terminals, respectively, and request retransmission of the transmission synchronization information and content packets from the ACRs 150 and 160 according to the determination result, respectively. The RASs 120 to 140 receive transmission synchronization information retransmitted from the ACRs 150 and 160 to determine a transmission time to mobile terminals, respectively. Also, the RASs 120 to 140 transmit content packets, retransmitted from the ACRs 150 and 160, to mobile terminals, respectively. This will be described in detail with reference to FIG. 2.

When a mobile terminal requests retransmission of a lost content packet, each of the RASs 120 to 140 retransmits a content packet to a mobile terminal that has requested the retransmission of the lost content packet. In this case, each RAS retransmits a normal content packet to the mobile terminal in the unicast scheme.

Each of the ACRs 150 and 160 receives transmission synchronization information transmitted from the MBS controller 190 and transmits the transmission synchronization information to a corresponding RAS. In this case, each of the ACRs 150 and 160 may receive an MBS zone identifier and a multicast IP address from the MBS controller 190 and transmit the MBS zone identifier and the multicast IP address to each RAS. Here, each of the ACRs 150 and 160 has transmission synchronization information for the same MBS flow, in the same MBS zone, and identifies an MBS flow by using a multicast IP address.

Here, the transmission synchronization information may include a reference time for transmitting a content packet from each RAS, an interval time for checking whether each RAS is capable of transmitting the content packet, and a predetermined threshold time more than or equal to the maximum time that is taken in receiving the content packet transmitted from the MBS content source 180.

Each of the ACRs 150 and 160 receives a content packet including content time information transmitted from the MBS content source 180 and transmits the content packet to each RAS. Here, the content time information may include a time at which the content packet is transmitted from the MBS content source 180, and a sequence number of the content packet.

According to an embodiment of the present invention, the ACRs 150 and 160 monitor whether a retransmission request for transmission synchronization information or a content packet is received from each of the RASs 120 to 140, and when the retransmission request is received, the ACRs 150 and 160 retransmit the transmission synchronization information or the content packet to a corresponding RAS. This will be described in detail with reference to FIG. 3.

Figure 2:
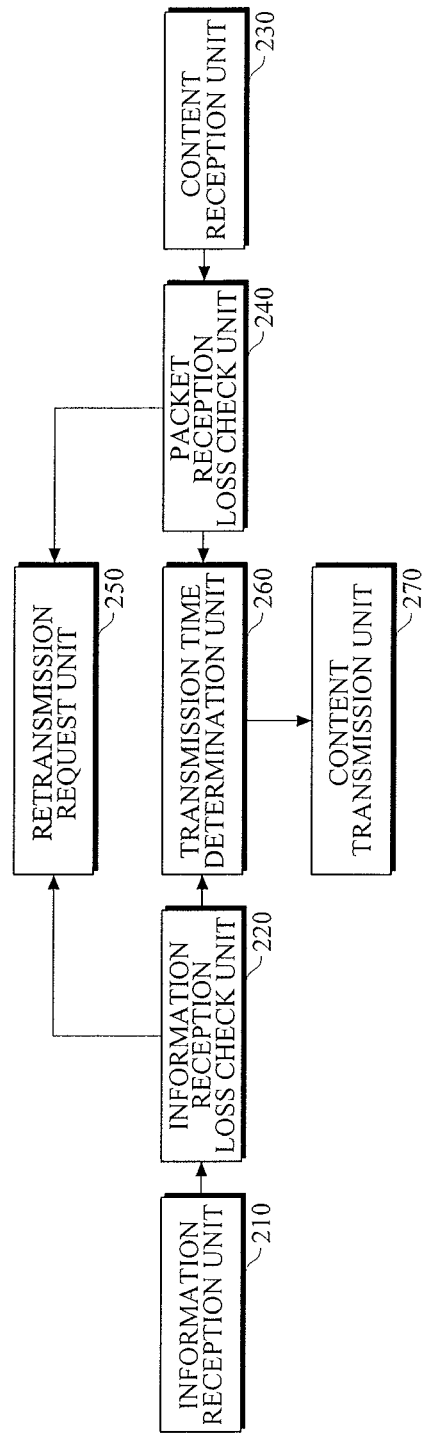
FIG. 2 is a block diagram illustrating an MBS data transmission synchronization apparatus included in an RAS according to an embodiment of the present invention.

FIG. 2 is a block diagram illustrating an MBS data transmission synchronization apparatus included in an RAS according to an embodiment of the present invention.

Referring to FIG. 2, the MBS data transmission synchronization apparatus includes an information reception unit 210, an information reception loss check unit 220, a content reception unit 230, a packet reception loss check unit 240, a retransmission request unit 250, a transmission time determination unit 260, and a content transmission unit 270.

The information reception unit 210 receives transmission synchronization information transmitted from the MBS controller 190 through the ACRs 150 and 160. In this case, the information reception unit 210 may receive an MBS zone identifier and a multicast IP address transmitted from the MBS controller 190, through the ACRs 150 and 160.

Here, the transmission synchronization information is information that is necessary for determining a transmission time such that all the RASs 120 to 140 having the same MBS zone identifier transmit content packets to mobile terminals 10 located in a corresponding cells through a wireless section at the same time. In this case, the transmission synchronization information may include a reference time for transmitting a content packet from each RAS, an interval time for checking whether each RAS is capable of transmitting the content packet, and a predetermined threshold time more than or equal to the maximum time that is taken in receiving the content packet transmitted from the MBS content source 180. That is, each RAS checks whether to enable transmission of a content packet, at the interval time from the reference time.

Here, the reference time is identically applied to all RASs included in the same MBS zone. In this case, the reference time may be the sum of a time (at which the MBS content source 180 starts to transmit a content packet), a threshold time, and a buffering time that is taken by a dejjitter buffer of each RAS. Also, each RAS may determine whether the content packet is lost by using the threshold time. For example, when each RAS cannot receive the content packet transmitted from the MBS content source 180 within the threshold time, each RAS determines that the content packet has been lost in an IP core network section or a section between an ACR and an RAS.

As an example, the threshold time may be 2 sec to 3 sec, but is not limited thereto. The threshold time may vary according to conditions, and may be determined by an MBS content provider or a mobile terminal provider.

The information reception loss check unit 220 determines whether transmission synchronization information received by the information reception unit 210 through an ACR is lost, and when the transmission synchronization information has been lost, the information reception loss check unit 220 allows the retransmission request unit 250 to request retransmission of normal transmission synchronization information. The information reception loss check unit 220 transmits lossless transmission synchronization information to the transmission time determination unit 260.

The content reception unit 230 receives a content packet transmitted from the MBS content source 180 through an ACR. Here, the content packet may include content time information, which may include a time at which the content packet is transmitted from the MBS content source 180 and a sequence number of the content packet. In this case, the content reception unit 230 may sequentially store content packets sequentially received from the MBS content source 180 in a circular buffer or a static buffer. That is, the content reception unit 230 receives a content packet including a time at which the content packet is transmitted from the MBS content source 180 and a sequence number from the MBS content source 180 through an ACR.

The packet reception loss check unit 240 determines whether a content packet received by the content reception unit 230 is lost. The packet reception loss check unit 240 searches the sequence number of a content packet received within a predetermined standby time, and when a portion of the content packet is lost or all of the content packet is not received, the packet reception loss check unit 240 allows the retransmission request unit 250 to request retransmission of a normal content packet. Furthermore, the packet reception loss check unit 240 transmits a lossless content packet to the transmission time determination unit 260.

The retransmission request unit 250 transmits a retransmission request message for synchronization information and a content packet to the ACRs 150 and 160 according to requests from the information reception loss check unit 220 and the packet reception loss check unit 240.

The transmission time determination unit 220 determines a transmission time of a content packet on the basis of transmission synchronization information received by the information reception unit 210 and content time information received by the content reception unit 230.

The transmission time determination unit 260 compares a threshold time included in transmission synchronization information and a difference between a current time for transmitting a corresponding content packet received by the content reception unit 230 and a time at which the content packet is transmitted from the MBS content source, and determines a transmission time on the basis of the comparison result. That is, when the threshold time is less than the difference between the current time for transmitting the corresponding content packet and the time at which the content packet is transmitted from the MBS content source, the transmission time determination unit 260 determines the current time as a transmission time of the content packet.

On the other hand, when the threshold time is greater than the difference between the current time for transmitting the corresponding content packet and the time at which the content packet is transmitted from the MBS content source, the transmission time determination unit 260 stands by for an interval time included in the transmission synchronization information, and then determines a transmission time of the content packet. That is, the transmission time determination unit 260 again determines a transmission time of the content packet with an updated new current time (when the interval time elapses).

The content transmission unit 270 transmits a corresponding content packet to mobile terminals in a corresponding cell at the transmission time that has been determined by the transmission time determination unit 260. In this case, when a mobile terminal requests retransmission of a normal content packet due to the loss of the content packet, the content transmission unit 270 may retransmit the normal content packet to the mobile terminal in a unicast scheme.

Figure 3:
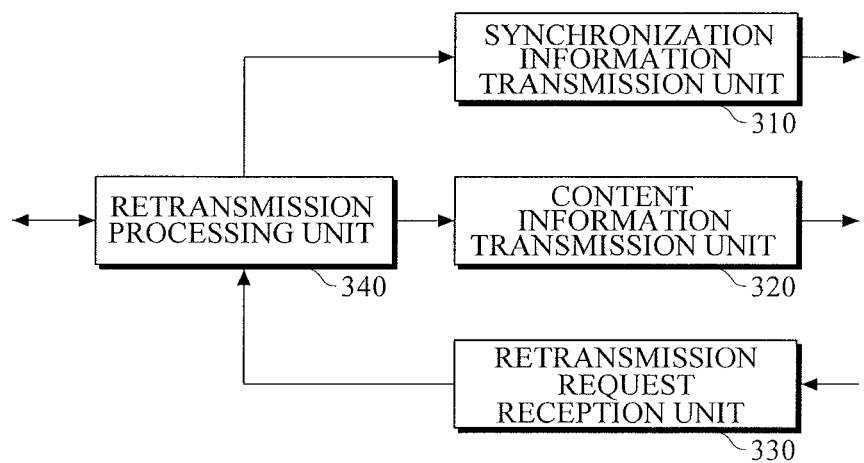
FIG. 3 is a block diagram illustrating an MBS data transmission synchronization apparatus included in an ACR according to an embodiment of the present invention.

FIG. 3 is a block diagram illustrating an MBS data transmission synchronization apparatus included in an ACR according to an embodiment of the present invention.

Referring to FIG. 3, the MBS data transmission synchronization apparatus included in an ACR includes a synchronization information transmission unit 310, a content information transmission unit 320, a retransmission request reception unit 330, and a retransmission processing unit 340.

The synchronization information transmission unit 310 transmits synchronization information, transmitted from the MBS controller 190, to each of the RASs 120 to 140. The content information transmission unit 320 transmits a content packet, transmitted from the MBS content source 180, to each of the RASs 120 to 140.

The retransmission request reception unit 330 receives a retransmission request for the transmitted transmission synchronization information or content packet from each of the RASs 120 to 140, and transmits the retransmission request to the retransmission processing unit 340. That is, the retransmission request reception unit 330 transmits a synchronization information transmission notification message to a multicast IP address, and monitors whether a synchronization information retransmission request is received from each RAS during a predetermined standby time (which is determined as a standby time necessary for a radio resource allocation scheduler) from a time at which the synchronization information transmission notification message is transmitted. When a synchronization information retransmission request is received from each RAS, the retransmission request reception unit 330 notifies the retransmission processing unit 340 of the synchronization information retransmission request.

Then, the retransmission processing unit 340 outputs a control signal to the synchronization information transmission unit 310 such that transmission synchronization information is retransmitted to a corresponding RAS through a unicast IP address.

However, when the synchronization information retransmission request message is not received from each RAS within the predetermined standby time, the retransmission request reception unit 330 determines that all the RASs have received synchronization information.

The retransmission request reception unit 330 transmits packet data to each RAS through a multicast IP address, and monitors whether a retransmission request for a lost content packet is received from each RAS during a predetermined standby time (which is determined as a standby time necessary for the radio resource allocation scheduler) from a time at which the packet data is transmitted. When a content packet retransmission request is received from each RAS, the retransmission request reception unit 330 notifies the retransmission processing unit 340 of the content packet retransmission request.

Then, the retransmission processing unit 340 outputs a control signal to the content information transmission unit 320 such that a content packet is retransmitted to a corresponding RAS through a unicast IP address.

However, when a corresponding packet retransmission request message is not received from each RAS within the predetermined standby time, the retransmission request reception unit 330 determines that all the RASs have received a content packet without loss.

The retransmission processing unit 340 inputs a control signal that enables the retransmission of synchronization information and a content packet whose retransmission has been requested to the synchronization information transmission unit 310 and the content information transmission unit 320.

Therefore, the synchronization information transmission unit 310 and the content information transmission unit 320 retransmit corresponding synchronization information and a corresponding content packet to an RAS that has requested retransmission through a predetermined unicast IP address.

Figure 4:
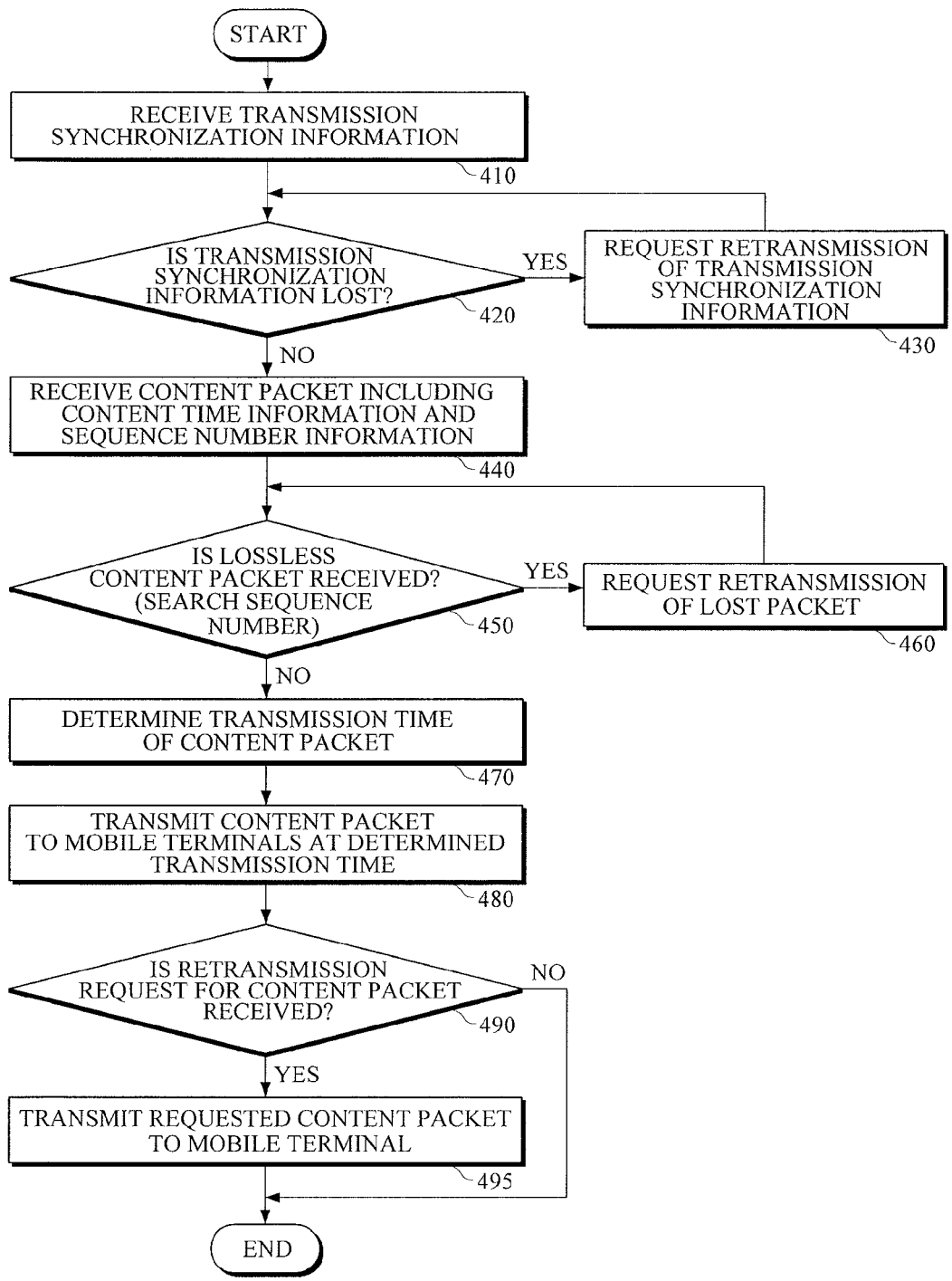
FIG. 4 is an operational flowchart illustrating an MBS data transmission synchronization method in the RAS according to an embodiment of the present invention.

FIG. 4 is an operational flowchart illustrating the MBS data transmission synchronization method in the RAS according to an embodiment of the present invention.

Referring to FIG. 4, in the MBS data transmission synchronization method, a transmission synchronization apparatus of an RAS receives transmission synchronization information from the MBS controller in operation 410. In this case, the transmission synchronization information may be received from the ACR. That is, when one ACR is included in an MBS zone, the MBS controller is not separately configured, and by adding the function of the MBS controller to the ACR, the ACR performs the function of the MBS controller, whereby the transmission synchronization apparatus receives the transmission synchronization information from the ACR. However, when two or more ACRs are included in an MBS zone, the MBS controller may be separately configured, and the transmission synchronization apparatus may receive the transmission synchronization information from the MBS controller.

Here, the transmission synchronization information may include a reference time for transmitting a content packet from the RAS, an interval time for checking whether the RAS is capable of transmitting the content packet, and a predetermined threshold time more than or equal to the maximum time that is taken in receiving the content packet transmitted from the MBS content source.

Therefore, the RAS determines whether the transmission synchronization information is lost in operation 420.

When it is determined in operation 420 that the transmission synchronization information is lost, the RAS transmits a retransmission request message for the transmission synchronization information to the ACR in operation 430.

However, when it is determined in operation 420 that the transmission synchronization information is not lost, the RAS processed to operation 440.

In operation 440, the RAS receives a content packet, including content time information, from the MBS content source through the ACR. Here, the content time information may include a time at which the content packet is transmitted from the MBS content source, and a sequence number of the content packet.

The ARS determines whether the content packet is lost in operation 450. When it is determined in operation 450 that the content packet is lost, the RAS requests retransmission of a normal content packet in operation 460.

However, when it is determined in operation 450 that the content packet is not lost, the RAS determines a transmission time for transmitting a content packet through a wireless section, on the basis of the transmission synchronization information received from the MBS controller and the content time information received from the MBS content source, in operation 470. In operation 480, the RAS transmits a content packet to mobile terminals located in a cell at the determined transmission time.

In operation 490, the RAS determines whether a message that requests retransmission of a content packet is received from a mobile terminal in the unicast scheme. When it is determined in operation 490 that the message is received from the mobile terminal, the RAS transmits the requested content packet to the mobile terminal in the unicast scheme in operation 495. However, when it is determined in operation 490 that the message is not received from the mobile terminal, the MBS data transmission synchronization method is ended.

Figure 5:
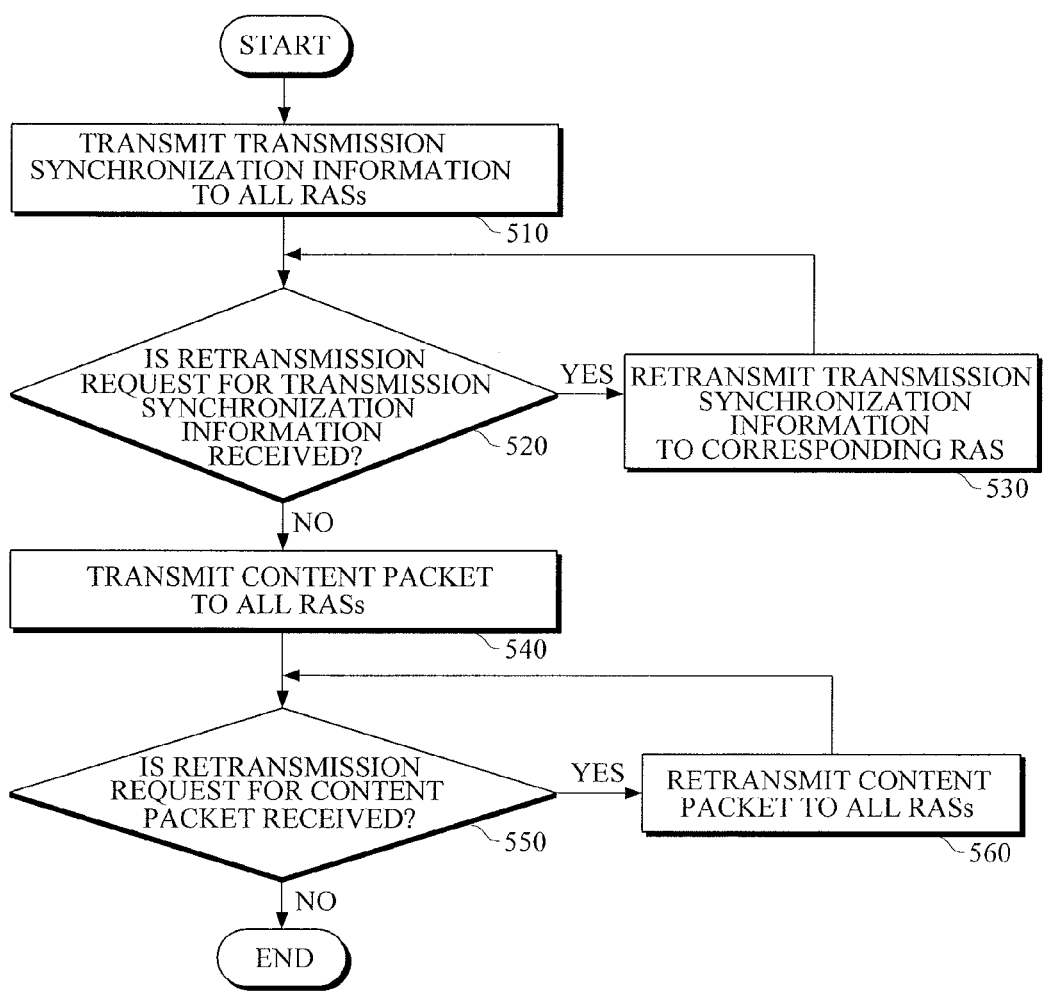
FIG. 5 is an operational flowchart illustrating the MBS data transmission synchronization method in the ACR according to an embodiment of the present invention.

FIG. 5 is an operational flowchart illustrating the MBS data transmission synchronization method in the ACR according to an embodiment of the present invention.

Referring to FIG. 5, an ACR transmits transmission synchronization information to all ARSs in operation 510. The ACR monitors whether a retransmission request for the transmission synchronization information is received in operation 520. That is, the ACR transmits a synchronization information transmission notification message to a multicast IP address, and monitors whether a synchronization information retransmission request is received from each of the RASs during a predetermined standby time (which is determined as a standby time necessary for the radio resource allocation scheduler) from a time at which the synchronization information transmission notification message is transmitted.

When it is determined in operation 520 that the transmission synchronization information retransmission request is received from a specific RAS, the ACR transmits transmission synchronization information to the specific RAS in operation 530. In this case, the ACR may transmit the transmission synchronization information through a unicast IP address.

However, when it is determined in operation 520 that the transmission synchronization information retransmission request is not received, the ACR transmits a content packet to all the RASs in operation 540.

The ACR determines whether a retransmission request for the content packet is received in operation 550.

That is, the ACR transmits packet data to each RAS through a multicast IP address, and monitors whether a retransmission request for lost packet data is received from each RAS during a predetermined standby time (which is determined as a standby time necessary for the radio resource allocation scheduler) from a time at which the packet data is transmitted.

When it is determined in operation 550 that the retransmission request for the content packet is received, the ACR retransmits a content packet to a corresponding RAS in operation 560. In this case, the ACR may transmit the content packet through a unicast IP address. However, when it is determined in operation 550 that the retransmission request for the content packet is not received, the MBS data transmission synchronization method is ended.

The present invention prevents the loss of transmission synchronization information and packet data, and thus can perform reliable MBS data transmission synchronization. A plurality of base stations (RASs) are guaranteed in advance to receive lossless packet data and receive transmission synchronization information without loss, and thus, the present invention enables the determination of a reliable transmission sync time. Therefore, when a mobile terminal performs handover to a different RAS in the same MBS zone while receiving MBS contents, seamless reception of MBS contents is ensured, as is synchronization of MBS contents transmitted to mobile terminals in the same MBS zone with a reliable macro diversity gain. In this way, RASs (base stations) are guaranteed to receive lossless synchronization information and lossless packet data, and thus, the present invention can prevent mobile terminals from receiving duplicate MBS contents and prevent loss of MBS contents through reliable transmission synchronization of MBS contents.

A number of examples have been described above. Nevertheless, it will be understood that various modifications may be made. For example, suitable results may be achieved if the described techniques are performed in a different order and/or if components in a described system, architecture, device, or circuit are Combined in a different manner and/or replaced or supplemented by other components or their equivalents. Accordingly, other implementations are within the scope of the following claims.

What is claimed is:

1. A multicast and broadcast service (MBS) data transmission synchronization apparatus of a radio access station, comprising:
    an information reception unit configured to receive transmission synchronization information from an access control router (ACR);
    an information reception loss check unit configured to determine whether the transmission synchronization information received through the information reception unit is lost;
    a content reception unit configured to sequentially receive a content packet from an MBS content source, the content packet comprising content time information;
    a packet reception loss check unit configured to determine whether the content packet received through the content reception unit is lost;
    a retransmission request unit configured to transmit a retransmission request message for lost transmission synchronization information or a lost content packet to the ACR in response to a request from the information reception loss check unit or the packet reception loss check unit;
    a transmission time determination unit configured to determine a transmission time of the received content packet on the basis of the transmission synchronization information and the content time information; and
    a content transmission unit configured to transmit the received content packet to a plurality of mobile terminals at the transmission time.

2. The MBS data transmission synchronization apparatus of claim 1, wherein the packet reception loss check unit searches a sequence number of a received content packet within a predetermined standby time to determine whether all or a portion of the received content packet is lost.

3. The MBS data transmission synchronization apparatus of claim 1, wherein the transmission synchronization information comprises a reference time for transmitting the content packet, an interval time for checking whether to enable transmission of the content packet, and a predetermined threshold time more than or equal to a maximum time which is taken in receiving the content packet transmitted from the MBS content source.

4. The MBS data transmission synchronization apparatus of claim 3, wherein the content time information comprises a time at which the content packet is transmitted from the MBS content source and a sequence number of the content packet.

5. The MBS data transmission synchronization apparatus of claim 4, wherein when a difference between a current time for transmitting the content packet and a time at which the content packet is transmitted from the MBS content source is greater than the threshold time, the transmission time determination unit determines the current time as a transmission time of the content packet.

6. The MBS data transmission synchronization apparatus of claim 4, wherein when a difference between a current time for transmitting the content packet and a time at which the content packet is transmitted from the MBS content source is less than or equal to the threshold time, the interval time elapses from the current time, and then the transmission time determination unit determines a transmission time of the content packet.

7. The MBS data transmission synchronization apparatus of claim 1, wherein the information reception unit receives the transmission synchronization information transmitted from an MBS controller through the ACR.

8. The MBS data transmission synchronization apparatus of claim 1, wherein the information reception unit receives the transmission synchronization information from the ACR.

9. The MBS data transmission synchronization apparatus of claim 1, wherein when a retransmission request for a lost content packet is received from a mobile terminal, the content transmission unit retransmits the lost content packet to the mobile terminal.

10. The MBS data transmission synchronization apparatus of claim 9, wherein the content transmission unit retransmits the lost content packet to the mobile terminal in a unicast scheme.

11. A multicast and broadcast serVIce (MBS) data transmission synchronization apparatus of an access control router (ACR), comprising:
 a synchronization information transmission unit configured to wirelessly transmit transmission synchronization information to one or more radio access stations (RASs);
 a content packet transmission unit configured to transmit a content packet to the one or more RASs;
 a retransmission request reception unit configured to monitor whether a retransmission request for the transmission synchronization information or the content packet transmitted to the one or more RASs is received; and
 a retransmission processing unit comprising a retransmission controller configured to output a control signal to the synchronization information transmission unit or the content information transmission unit in response to reception of the retransmission request from the retransmission request reception unit, the control signal enabling retransmission of synchronization information or a content packet whose retransmission has been requested to a corresponding RAS.

12. The MBS data transmission synchronization apparatus of claim 11, wherein when a retransmission request for transmission synchronization information is received from the at least one RAS during a predetermined standby time from a time at which the transmission synchronization information is transmitted to the one or more RASs, the retransmission request reception unit notifies the retransmission controller of the reception of the retransmission request.

13. The MBS data transmission synchronization apparatus of claim 11, wherein when a retransmission request for a content packet is received from at least one RAS during a predetermined standby time from a time at which the content packet is transmitted to the one or more RASs, the retransmission request reception unit notifies the retransmission controller of the reception of the retransmission request.

14. The MBS data transmission synchronization apparatus of claim 11, wherein the retransmission controller outputs a control signal that allows transmission synchronization information to be retransmitted to an RAS which has requested retransmission of the transmission synchronization information in a unicast scheme, to the synchronization information transmission unit.

15. The MBS data transmission synchronization apparatus of claim 11, wherein the retransmission controller outputs a control signal that allows a content packet to be retransmitted to an RAS which has requested retransmission of the content packet through a predetermined unicast IP address, to the content packet transmission unit.

16. A multicast and broadcast service (MBS) data transmission synchronization method in a radio access station, comprising:
 receiving transmission synchronization information from an access control outer (ACR);
 determining whether the received transmission synchronization information is lost;
 sequentially receiving a content packet from an MBS content source, the content packet comprising content time information;
 determining whether the received content packet is lost;
 transmitting a retransmission request message for lost transmission synchronization information or a lost content packet to the ACR;
 determining a transmission time of the received content packet on the basis of the transmission synchronization information and the content time information; and
 transmitting the received content packet to a plurality of mobile terminals at the transmission time.

17. A multicast and broadcast service (MBS) data transmission synchronization method in an access control router (ACR), comprising:
 monitoring whether a retransmission request for transmission synchronization information transmitted to one or more radio access stations (RASs) is received;
 monitoring whether a retransmission request for a content packet transmitted to one or more RASs is received;
 retransmitting transmission synchronization information whose retransmission has been requested to a corresponding RAS when the retransmission request for transmission synchronization information is received; and
 retransmitting a content packet whose retransmission has been requested to a corresponding RAS when the retransmission request for the content packet is received.

18. The MBS data transmission synchronization method of claim 17, further comprising:
 outputting a control signal to a synchronization information transmission unit or a content information transmission unit in response to reception of the retransmission request, the control signal enabling retransmission of synchronization information or a content packet whose retransmission has been requested to a corresponding RAS.

19. The MBS data transmission synchronization method of claim 17, wherein the transmission synchronization information is transmitted wirelessly to the one or more radio access stations (RASs).

* * * * *